(12) United States Patent
Pillai et al.

(10) Patent No.: US 11,978,234 B2
(45) Date of Patent: May 7, 2024

(54) METHOD AND APPARATUS OF DATA COMPRESSION

(71) Applicant: Advanced Micro Devices, Inc., Santa Clara, CA (US)

(72) Inventors: Pazhani Pillai, Boxborough, MA (US); Mark A. Natale, Boxborough, MA (US); Harish Kumar Kovalam Rajendran, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/135,978

(22) Filed: Dec. 28, 2020

(65) Prior Publication Data

US 2021/0358174 A1    Nov. 18, 2021

Related U.S. Application Data

(60) Provisional application No. 63/024,254, filed on May 13, 2020.

(51) Int. Cl.
*G06T 9/00* (2006.01)
*G06T 1/60* (2006.01)

(52) U.S. Cl.
CPC . *G06T 9/00* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 6,873,323 B1 * | 3/2005 | Morein | G06T 11/001 345/418 |
| 2013/0249897 A1 | 9/2013 | Dunaisky et al. | |
| 2013/0293565 A1 | 11/2013 | Arvo | |
| 2014/0176579 A1 | 6/2014 | Duluk, Jr. et al. | |
| 2014/0375666 A1 | 12/2014 | Akenine-Moller et al. | |
| 2017/0345186 A1 * | 11/2017 | Seiler | G06T 11/40 |
| 2018/0075574 A1 * | 3/2018 | Brennan | G06T 15/04 |
| 2019/0132603 A1 * | 5/2019 | Surti | G06T 15/503 |

FOREIGN PATENT DOCUMENTS

KR    10-2018-0050140 A    5/2018

* cited by examiner

*Primary Examiner* — Yi Wang
(74) *Attorney, Agent, or Firm* — Volpe Koenig

(57) ABSTRACT

A method and apparatus for processing color data includes storing fragment pointer and color data together in a color buffer. A delta color compression (DCC) key indicating the color data to fetch for processing is stored, and the fragment pointer and color data is fetched based upon the read DCC key for decompression.

32 Claims, 7 Drawing Sheets

METHOD AND APPARATUS OF DATA COMPRESSION

CROSS-REFERENCE TO RELATED APPLICATIONS

This application claims the benefit of U.S. Provisional Patent Application No. 63/024,254 filed May 13, 2020 and is incorporated by reference as if fully set forth herein.

BACKGROUND

In a multisample antialiasing (MSAA) technique for sampling an image, each pixel has multiple sampling points to improve quality of the image. These sampling points can each have a unique color value. However, sampling points of a pixel may share a common color value.

The values are stored by only storing each common color value once (e.g., per fragment, instead of once per sample). This data is stored in the color surface, and a fragment pointer (fmask) for each sample within a pixel is stored. This fragment pointer is stored in a separate fmask surface.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method for data compression for color surfaces is described herein.

A method for processing color data includes storing fragment pointer and color data together in a color buffer. A delta color compression (DCC) key indicating the color data to fetch for processing is stored, and the fragment pointer and color data is fetched based upon the read DCC key for decompression.

An apparatus for processing color data includes a memory and a processor operatively coupled with the memory and in communication with the memory. The processor is configured to store fragment pointer and color data together in a color buffer in the memory, read a delta color compression (DCC) key indicating the color data to fetch for processing, and fetch the fragment pointer and color data based upon the read DCC key for decompression.

A non-transitory computer-readable medium for processing color data has instructions recorded thereon, that when executed by the processor, cause the processor to perform operations. The operations include storing fragment pointer and color data together in a color buffer, reading a delta color compression (DCC) key indicating the color data to fetch for processing, and fetching the fragment pointer and color data based upon the read DCC key for decompression.

Figure 1:
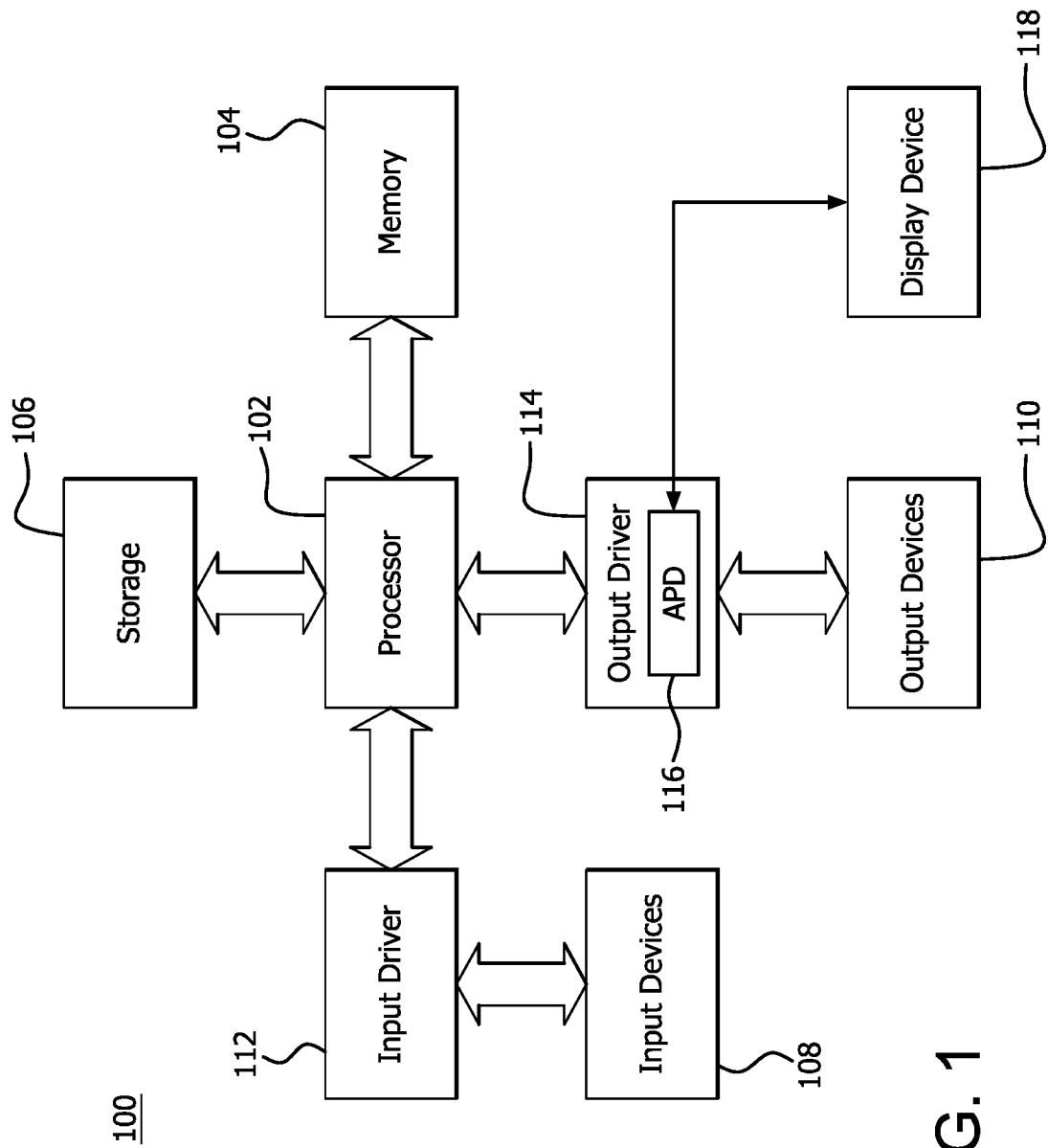
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, a server, a tablet computer or other types of computing devices for generating graphics images. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102 or is located separately from the processor 102. The memory 104 includes a volatile or non-volatile memory, for example, random access memory (RAM), dynamic RAM, or a cache. In the embodiment illustrated in FIG. 1, processor 102 includes a CPU.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110. It is noted that the input driver 112 and the output driver 114 are optional components, and that the device 100 will operate in the same manner if the input driver 112 and the output driver 114 are not present. In the exemplary embodiment the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm can perform the functionality described herein. Alternatively, it is contemplated that computing systems that do not perform processing tasks in accordance with a SIMD paradigm can also perform the functionality described herein.

Figure 2:
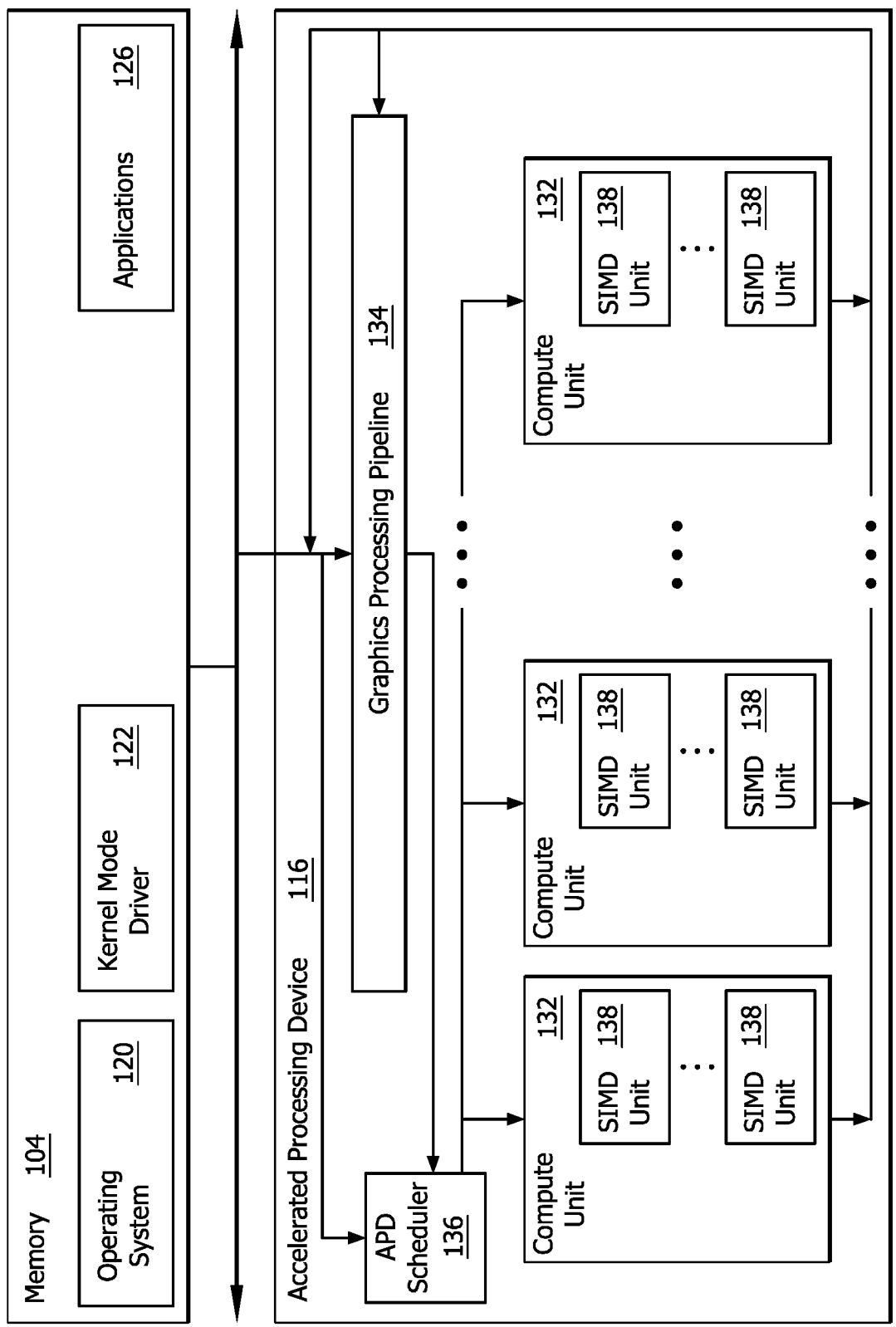
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with or using different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
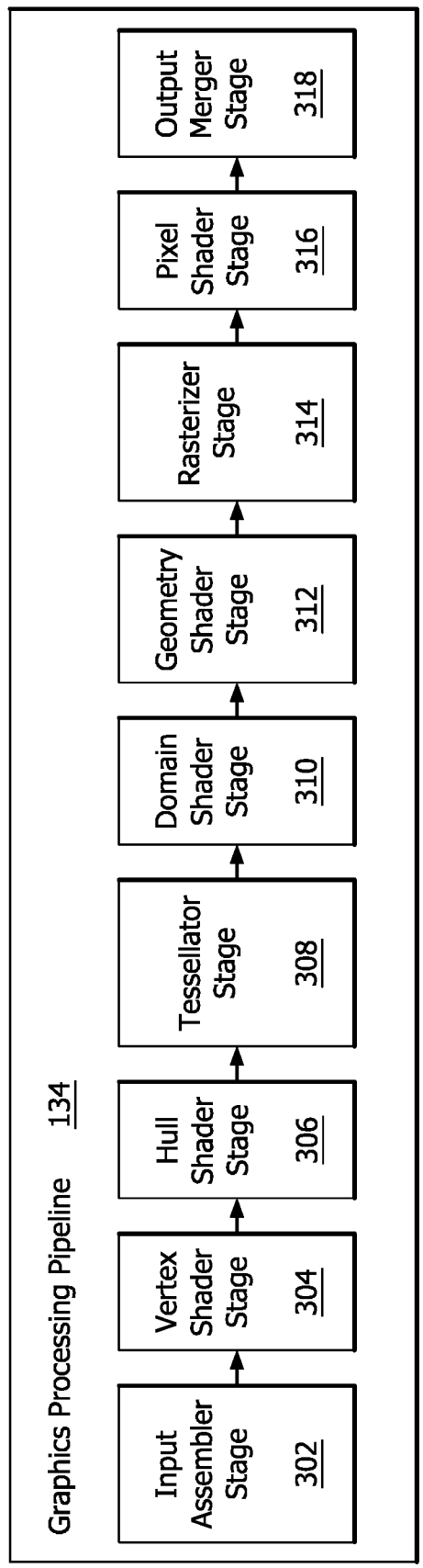
FIG. 3 is a block diagram illustrating a graphics processing pipeline, according to an example.

FIG. 3 is a block diagram showing additional details of the graphics processing pipeline 134 illustrated in FIG. 2. The graphics processing pipeline 134 includes logical stages that each performs specific functionality. The stages represent subdivisions of functionality of the graphics processing pipeline 134. Each stage is implemented partially or fully as shader programs executing in the programmable processing units 202, or partially or fully as fixed-function, non-programmable hardware external to the programmable processing units 202.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertexes of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations. Herein, such transformations are considered to modify the coordinates or "position" of the vertices on which the transforms are performed. Other operations of the vertex shader stage 304 modify attributes other than the coordinates.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the programmable processing units 202.

The geometry shader stage 312 performs vertex operations on a primitive-by-primitive basis. A variety of different types of operations can be performed by the geometry shader stage 312, including operations such as point sprint expansion, dynamic particle system operations, fur-fin generation, shadow volume generation, single pass render-to-cubemap, per-primitive material swapping, and per-primitive material setup. In some instances, a shader program that executes on the programmable processing units 202 perform operations for the geometry shader stage 312.

The rasterizer stage 314 accepts and rasterizes simple primitives and generated upstream. Rasterization includes determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 can apply textures from texture memory. Operations for the pixel shader stage 316 are performed by a shader program that executes on the programmable processing units 202.

The output merger stage 318 accepts output from the pixel shader stage 316 and merges those outputs, performing operations such as z-testing and alpha blending to determine the final color for a screen pixel.

Texture data, which defines textures, are stored and/or accessed by the texture unit 320. Textures are bitmap images that are used at various points in the graphics processing pipeline 134. For example, in some instances, the pixel shader stage 316 applies textures to pixels to improve apparent rendering complexity (e.g., to provide a more "photorealistic" look) without increasing the number of vertices to be rendered.

In some instances, the vertex shader stage 304 uses texture data from the texture unit 320 to modify primitives to increase complexity, by, for example, creating or modifying vertices for improved aesthetics. In one example, the vertex shader stage 304 uses a height map stored in the texture unit 320 to modify displacement of vertices. This type of technique can be used, for example, to generate more realistic looking water as compared with textures only being used in the pixel shader stage 316, by modifying the position and number of vertices used to render the water. In some instances, the geometry shader stage 312 accesses texture data from the texture unit 320.

Figure 4:
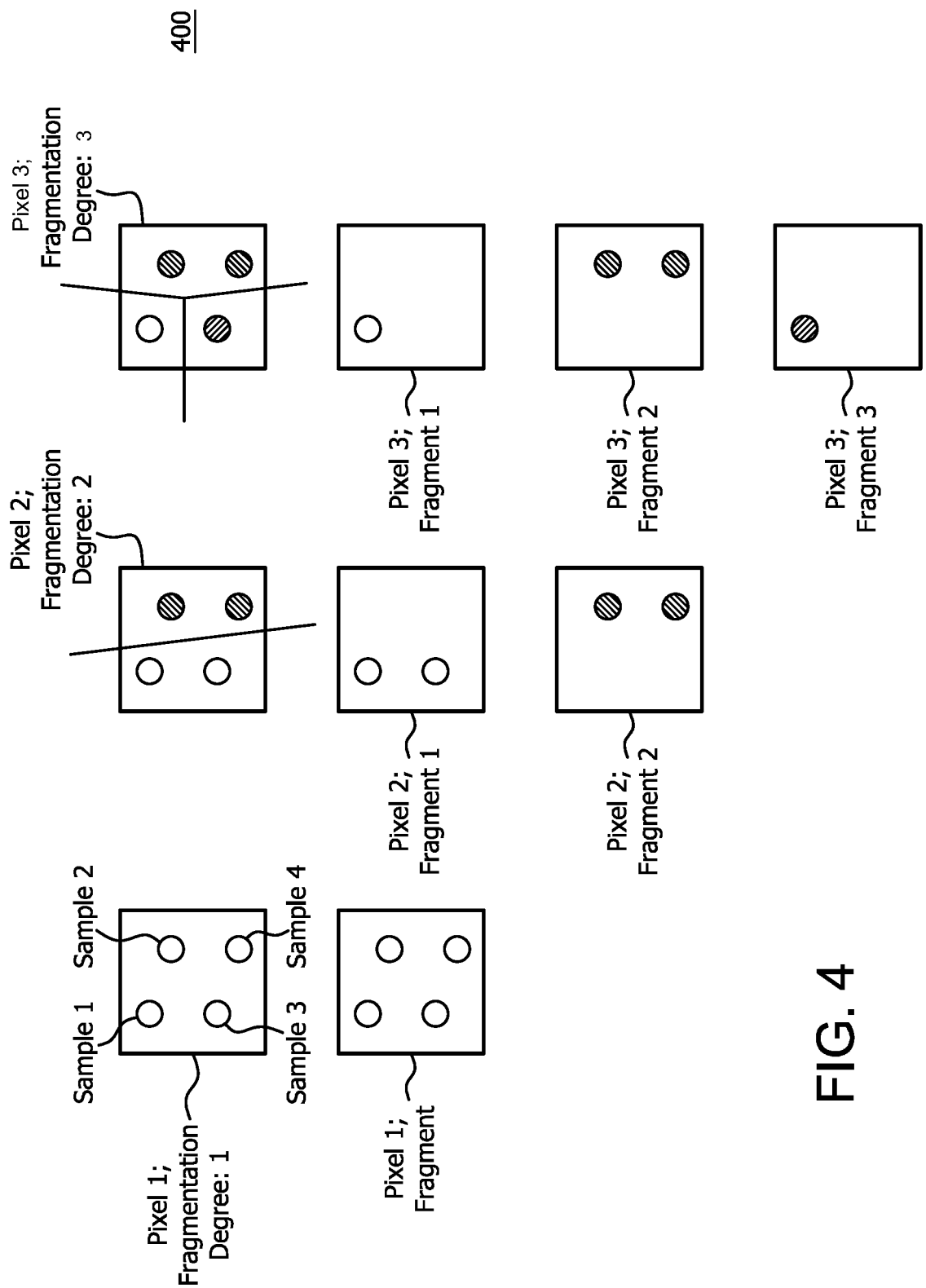
FIG. 4 is a graphical representation illustrating aspects related to a multi-sampled image.

A particular compression format is presented herein for compressed storing image data. The compression format is useful for, amongst other applications, for compressing multi-sampled images. FIG. 4 is a graphical representation 400 illustrating aspects related to a multi-sampled image. The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, can be implemented as a general purpose computer, a processor, or a processor core, or as a program, software, or firmware, stored in a non-transitory computer readable medium or in another medium, executable by a general purpose computer, a processor, or a processor core.

In FIG. 4, several pixels (e.g., Pixel 1, Pixel 2, Pixel 3) are shown. A multi-sampled image would include a grid of these pixels. Each pixel includes one or more samples (e.g., Sample 1, Sample 2, Sample 3, Sample 4). A sample is a particular location within a pixel that has a particular color. Each sample is able to have a different color than the colors of the other samples in the same pixel. In FIG. 4, the shading for each sample represents the color assigned to the sample.

Three different pixels are shown. Pixel 1 has a fragmentation degree of 1. Thus pixel 1 is completely unfragmented and all samples in pixel 1 have the same color. Pixel 1 is representable as a single fragment—shown as pixel 1, fragment 1. A "fragment" is a portion of a pixel in which all samples have the same color.

Pixel 2 has a fragmentation degree of 2. The two left-most samples have one color and the two right-most samples have a different color. Thus pixel 2—fragment 1 has the two left most samples and pixel 2—fragment 2 has the two right most samples.

Pixel 3 has a fragmentation degree of 3. Pixel 3, fragment 1 contains the top left sample. Pixel 3, fragment 2 contains the two right samples. Pixel 3, fragment 3 contains the bottom left sample. The compression format describes how to compress data describing these pixels for storage in one or more hardware buffers.

Figure 5:
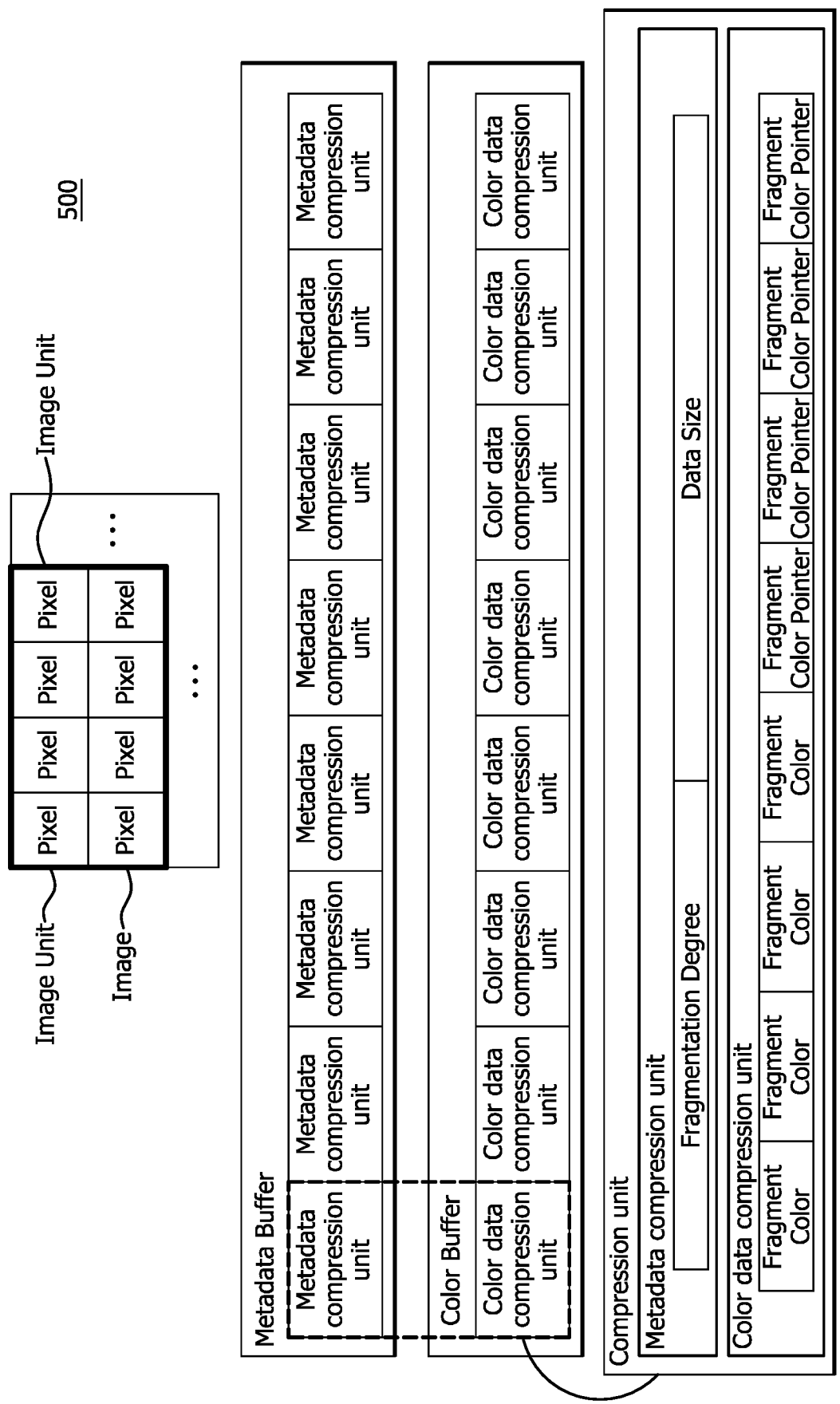
FIG. 5 illustrates a compression format according to an example.

FIG. 5 illustrates a compression format 500 according to an example. An image is illustrated to show the correlation between the data stored in the compression format and the image. The image includes image units, each of which includes one or more pixels. An image unit is a portion of the image including one or more pixels.

The compression format includes the contents of a metadata buffer and a color buffer. In some implementations, the metadata buffer and color buffer are physical buffers like caches that are configured to store the data described herein. In other implementations, one or both of those buffers represent data stored in any memory structure, such as a cache, memory, non-volatile memory, or any other storage.

The metadata buffer stores metadata compression units (which are data describing the compression) and the color buffer stores color data compression units. Each combination of one metadata compression unit and one color data compression unit forms a compression unit. Each metadata compression unit is associated with only one compression unit and each color data compression unit is associated with only one compression unit.

A compression unit is the compressed data for an image unit of an image. In some implementations, a compression unit is a fixed amount of data and can have "empty" or "unused" space depending on the amount of data necessary to compress the corresponding image unit. In some such implementations, each of the metadata buffer and the color buffer represent a dedicated memory such as a dedicated cache memory or represent a dedicated portion of a memory such as a cache memory. In some such implementations, each compression unit corresponds to one or more cache lines. In other implementations, a compression unit is a variable amount of data and the compression units are packed together to reduce total amount of data for the image.

The metadata compression units store, for example, a fragmentation degree and a data size, and, in some implementations, a sampling rate. Additionally, the metadata units can indicate that the compressed data has fragmentation, and the fragmentation degree is stored within the compressed data.

Alternatively, the metadata units can indicate that there is a form of compression, which can indicate that the compressed data size is less than the size of the block, and the compressed data can indicate that there is fragmentation, and to what degree.

The fragmentation degree indicates the maximum degree of fragmentation of the pixels in the image unit corresponding to the compression unit that includes the metadata compression unit. Fragmentation degree is illustrated in FIG. 4. The metadata compression units also store a data size. The data size indicates the size of the corresponding color data compression unit (i.e., the number of bits of the color data compression unit that belongs to the same compression unit as the metadata compression unit).

Each color data compression unit includes one or more fragment color pointers and one or more items of fragment color data. The fragment color pointers indicate which fragment color a particular sample for a particular pixel has. In some examples, each color data compression unit includes one fragment color pointer for each sample in a corresponding image unit. Thus, each color data compression unit includes a number of fragment color pointers equal to the number of samples in the corresponding image unit.

For a given sample, the corresponding fragment color pointer indicates or points to the corresponding fragment color. In some implementations, the ordering of the fragment color pointers within the color data compression unit allows for an identification of which fragment color pointer corresponds to which sample.

In an example with two samples per pixel, a first fragment color pointer (e.g., the lowest order bits) corresponds to a first sample of a first pixel within an image unit, a second fragment color pointer (e.g., the next lowest order bits) corresponds to a second sample of the first pixel, a third fragment color pointer (e.g., the next lowest order bits) corresponds to a first sample of a second pixel of the image unit, and a fourth fragment color pointer (e.g., the next lowest order bits) corresponds to a second sample of a second pixel of the image unit.

In implementations in which the sampling rate is stored in the metadata compression unit, the sampling rate indicates the number of samples per pixel in the corresponding image unit.

The fragment colors in the color data compression unit include the actual color values for the particular fragments. As just described, each fragment color pointer indicates which of these fragment colors actually applies to a corresponding fragment. As with the fragment color pointers, in some implementations, the fragment colors are arranged sequentially in the color data compression unit, and each fragment color pointer identifies an individual fragment color data item for the corresponding sample. In some examples, fragment colors are specific to individual pixels. In other words, each pixel stores one or more color fragments and the fragment color pointers selects, for each pixel, which fragment colors is the color for the corresponding sample.

The fragment color data itself can be compressed. An example compression scheme for the fragment color data is delta color compression ("DCC"), which stores a base color (e.g., the color for one of the samples in a pixel or other compression group such as an image unit) and a color delta for each other sample, where a color delta is the difference between the base color and the actual color of the corresponding sample.

The fragment color pointers and fragment color data can be of variable lengths. In one example, the length of each fragment color pointer is equal to the number of bits required to represent the maximum number of fragments in each pixel. In an example, four fragments are allowed in each pixel, meaning that each pixel of the image unit is permitted to have a maximum of four fragments. In this example, the size of the fragment color pointers for each sample is two bits (since two bits can represent four possible values). In another example, the maximum number of fragments in each pixel of an image unit is two, meaning that each pixel is permitted to include at most two fragments, and thus the size of the fragment color pointers for each sample is one bit. In some examples, because compression algorithms can generate data of different sizes, each fragment color can have a different length. Further, in the case where only a single fragment is included (i.e., 1 fragment), there is no fragment pointer to be stored since all samples are pointing to the first fragment (e.g., they are of 0 length).

Figure 6:
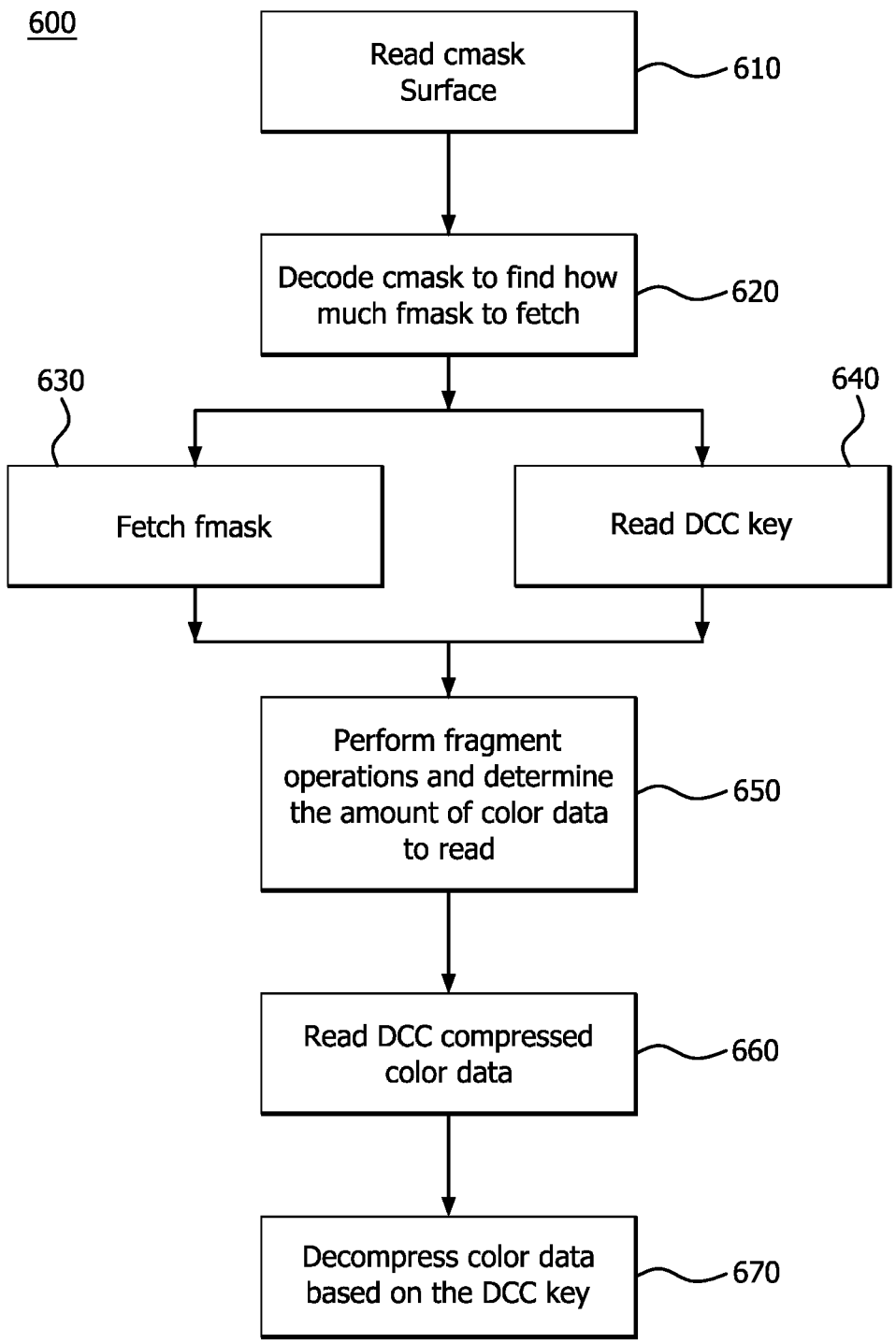
FIG. 6 is an example flow diagram of a conventional data processing method.

FIG. 6 is an example flow diagram 600 of a conventional compression method. In step 610, the cmask surface is read. In step 620, the cmask surface is decoded to find out how much of the fmask needs to be fetched.

Once it is determined how much of the fmask needs to be fetched in step 620, the fmask is fetched (step 630) and the DCC key is read (step 640). Fragment operations are performed and the amount of color data is read (step 650).

The DCC compressed color data can then be read (step 660) and the color data is decompressed based on the DCC key (step 670). In the conventional method, there are two surfaces to describe the entire color data—the color data fragments themselves and the fmask data, which is a pointer information to the color data fragments. That is, in the conventional compression method, there are two pairs of surfaces, one pair of surfaces are the fragment pointers and compression metadata (fmask and cmask surfaces), and the other pair is the color surface and its metadata (color data fragments and the DCC key).

Figure 7:
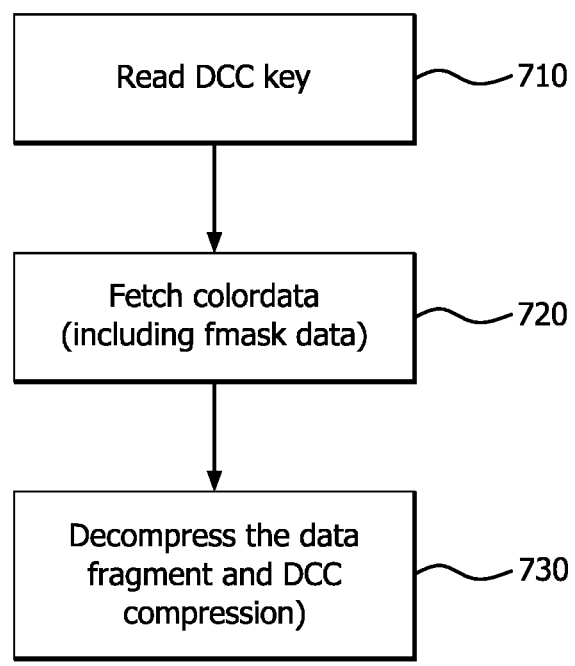
FIG. 7 is an example flow diagram of a data processing method.

FIG. 7 is an example flow diagram of a data processing method 700. In step 710, the DCC key is read. The color data is then fetched based upon the DCC key, and includes the fmask data (step 720). In step 730, the color data, (including the color fragments and the DCC compression) are decompressed. Also, only the DCC can be compressed, and the color data is stored in the cache in fragment compressed form. Alternatively, the color data can be stored fully compressed. In this scenario, the decompression is performed when accessing the cache to process pixels/samples, and then recompressed when writing data back into the cache.

In the example method 700, the data being fetched in step 720 includes the fragment pointers about the data (e.g., the fmask data) as well as the color fragment data itself. Once the data is fetched, it can be stored in fully compressed form, or the DCC is decompressed and stored in fragment compressed form. Also, the data can be fully decompressed.

If storing in fragment compressed form, the fragment color data and the fragment pointers can be stored in separate data structures, which can provide for easier processing. Also, the data can be stored in fragment compressed form if the fragmentation degree is less than a certain degree. For example, it can be stored in fragment compressed form if fragmentation is of degree 1. In this case, there may not need not be any storage needed for fragment pointers, (e.g., if there is only 1 fragment, the fragment pointers will all point to that fragment).

There can be performance advantages to storing the data in fragment compressed form. For example, if a fully covered is blended pixel on top a single fragment pixel, it can be blended once for the entire pixel. However, if the pixel is fully decompressed, the information indicating that all samples have the same value can be lost, and so, the blender would need to do the blend operation once per sample, instead of once per pixel.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, can be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for processing color data, comprising:
   storing, in a color buffer, first color data in a fragment compressed form based on a fragmentation degree of the first color data;
   storing, in the color buffer, second color data in a fully compressed form based on a fragmentation degree of the second color data;
   and
   fetching, from the color buffer, a fragment pointer and color data for either the first color data or the second color data, wherein the fetching uses a delta color compression (DCC) key for decompression.

2. The method of claim 1, further comprising storing the color data decompressed.

3. The method of claim 1, further comprising storing the color data in a compressed form.

4. The method of claim 3, further comprising decompressing the color data.

5. The method of claim 1, further comprising decompressing the color data using the DCC key to form DCC data.

6. The method of claim 5, further comprising storing the DCC data in fragment compressed form.

7. The method of claim 6 wherein the color data and the fragment pointer for the DCC data are stored in a separate data structure in the color buffer.

8. The method of claim 6 wherein the DCC data is stored in fragment compressed form based upon the fragmentation degree of the first color data or the second color data.

9. The method of claim 8 wherein the DCC data is stored in fragment compressed form if the fragmentation degree is equal to one.

10. An apparatus for processing color data, comprising:
    a memory that stores a color buffer; and
    a processor operatively coupled with the memory and in communication with the memory, wherein the processor configured to:
    store, in the color buffer, first color data in fragment compressed form based on a fragmentation degree of the first color data,
    store, in the color buffer, second color data in a fully compressed form based on a fragmentation degree of the second color data,
    and
    fetch, from the color buffer, a fragment pointer and color data for either the first color data or the second color data, wherein the fetch uses a delta color compression (DCC) key.

11. The apparatus of claim 10 wherein the processor stores the color data decompressed in the memory.

12. The apparatus of claim 10 wherein the processor stores the color data in a compressed form in the memory.

13. The apparatus of claim 12 wherein the processor decompresses the color data.

14. The apparatus of claim 10 wherein the processor decompresses the color data using the DCC key to form DCC data.

15. The apparatus of claim 14 wherein the processor stores the DCC data in fragment compressed form.

16. The apparatus of claim 15 wherein the color data and the fragment pointer for the DCC data are stored in a separate data structure in the color buffer.

17. The apparatus of claim 15 wherein the DCC data is stored in fragment compressed form based upon the fragmentation degree.

18. The apparatus of claim 17 wherein the DCC data is stored in fragment compressed form if the fragmentation degree is equal to one.

19. A non-transitory computer-readable medium for processing color data, the non-transitory computer-readable medium having instructions recorded thereon, that when executed by a processor, cause the processor to perform operations including:
    storing, in a color buffer, first color data in a fragment compressed form based on a fragmentation degree of the first color data;

storing, in the color buffer, second color data in a fully compressed form based on a fragmentation degree of the second color data; and fetching, from the color buffer, a fragment pointer and color data for either the first color data or the second color data, wherein the fetching uses a delta color compression (DCC) key.

20. The non-transitory computer readable medium of claim 19, further comprising storing the color data decompressed.

21. A method for processing color data, comprising:
compressing and storing first data in a color buffer in fragment compressed form based on a fragmentation degree of the first data;
compressing and storing second data in the color buffer in a fully compressed form based on a fragmentation degree of the second data;
compressing and storing third data, the third data including information relating to the compression of the first data or the second data; and
fetching the first data or the second data as color data for processing based upon the information stored in the third data.

22. The method of claim 21 wherein the first data includes fragment color data and a fragment pointer relating to the fragment color data.

23. The method of claim 22 wherein the fragment color data and the fragment pointer are stored in a separate data structure in the color buffer that stores the first data and the second data.

24. The method of claim 21 wherein:
the fetching uses a delta color compression (DCC) key indicating color data of the first data or the second data, and
the method further comprises:
decompressing the color data using the DCC key to form DCC data.

25. The method of claim 24 wherein the DCC data is stored in fragment compressed form based upon the fragmentation degree.

26. The method of claim 25 wherein the DCC data is stored in fragment compressed form if the fragmentation degree is equal to one.

27. An apparatus for processing color data, comprising:
a memory; and
a processor operatively coupled with the memory and in communication with the memory, the processor configured to:
compress and store first data in a color buffer in fragment compressed form based on a fragmentation degree of the first data,
compress and store second data in the color buffer in a fully compressed form based on a fragmentation degree of the second data;
compress and store third data, the third data including information relating to compression of the first data or the second data, and
fetch the first data or the second data as color data for processing based upon the information stored in the third data.

28. The apparatus of claim 27 wherein the first data includes fragment color data and a fragment pointer relating to the fragment color data.

29. The apparatus of claim 28 wherein the fragment color data and the fragment pointer are stored in a separate data structure in the color buffer that stores the fragment pointer and the color data.

30. The apparatus of claim 27 wherein:
the fetch uses a delta color compression (DCC) key indicating color data of the first data or the second data; and
the processor is further configured to decompress the color data using the DCC key to form DCC data.

31. The apparatus of claim 30 wherein the DCC data is stored in fragment compressed form based upon a fragmentation of the first data or the second data.

32. The apparatus of claim 31 wherein the DCC data is stored in fragment compressed form if the fragmentation is equal to one.

* * * * *